US009007381B2

(12) United States Patent
Huang et al.

(10) Patent No.: US 9,007,381 B2
(45) Date of Patent: Apr. 14, 2015

(54) TRANSITION ANIMATION METHODS AND SYSTEMS

(75) Inventors: Jian Huang, Sudbury, MA (US); Jack J. Hao, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 258 days.

(21) Appl. No.: 13/224,475

(22) Filed: Sep. 2, 2011

(65) Prior Publication Data

US 2013/0057555 A1    Mar. 7, 2013

(51) Int. Cl.
*G06T 13/80*    (2011.01)

(52) U.S. Cl.
CPC ..................... *G06T 13/80* (2013.01)

(58) Field of Classification Search
CPC ............... G06F 3/0481; G06F 9/4443; G06F 2203/04803; G06T 13/00; G06T 13/80; G06T 2200/24; G06T 2213/04
USPC .......... 345/684, 688, 691, 473–475, 949, 956, 345/959
See application file for complete search history.

(56) References Cited

U.S. PATENT DOCUMENTS

| 6,081,278 | A * | 6/2000 | Chen ............................. 345/473 |
| 6,546,397 | B1 * | 4/2003 | Rempell ............................. 1/1 |
| 6,646,655 | B1 * | 11/2003 | Brandt et al. ................. 715/723 |
| 7,872,654 | B2 * | 1/2011 | Scapel et al. .................. 345/473 |
| 2003/0063090 | A1 * | 4/2003 | Kraft et al. ..................... 345/475 |
| 2004/0160445 | A1 * | 8/2004 | Whatmough ................. 345/473 |
| 2007/0050448 | A1 * | 3/2007 | Gonen et al. .................. 709/204 |
| 2011/0080418 | A1 * | 4/2011 | Rhodes ......................... 345/522 |
| 2011/0122155 | A1 * | 5/2011 | Zechlin ......................... 345/660 |

* cited by examiner

*Primary Examiner* — Carlos Perromat

(57) ABSTRACT

An exemplary method includes a transition animation system detecting a screen size of a display screen associated with a computing device executing an application, automatically generating, based on the detected screen size, a plurality of animation step values each corresponding to a different animation step included in a plurality of animation steps that are to be involved in an animation of a transition of a user interface associated with the application into the display screen, and directing the computing device to perform the plurality of animation steps in accordance with the generated animation step values. Corresponding methods and systems are also disclosed.

10 Claims, 8 Drawing Sheets

Animation Step 1

Animation Step 2

Animation Step 3

TRANSITION ANIMATION METHODS AND SYSTEMS

BACKGROUND INFORMATION

Mobile applications (i.e., applications configured to be executed by mobile phones, tablet computers, and other types of mobile computing devices) have become widespread and popular. However, screen sizes (i.e., pixel resolutions) and processing capabilities of mobile devices vary greatly, thereby making it difficult for mobile application developers to develop applications that have a consistent look and feel regardless of the particular mobile device being used to execute them.

For example, it is often desirable to animate transitions between different user interfaces that are displayed by a mobile application. To illustrate, it may be desirable to replace a user interface displayed within a display screen of a mobile device with a new user interface by having the new user interface "slide"0 into the display screen. This is typically accomplished by directing the mobile device to perform a series of animation steps in which the display screen is repeatedly redrawn or re-rendered. Each time the display screen is redrawn, an increasing number of pixels included in the display screen are occupied by the new user interface until the new user interface is completely displayed within the display screen.

Unfortunately, the actual number of pixels that are to be occupied by the new user interface after each animation step depends on the specific screen size of the display screen, which, as mentioned above, may vary from device to device. To remedy this problem, mobile application developers have traditionally had to hard-code the exact number of pixels to be occupied by the new user interface after each animation step is performed and/or the speed at which each animation step is to be performed for each of a multitude of different screen sizes. Not only is this cumbersome and difficult to perform, but it requires constant updates to the mobile application over time as new mobile devices having previously unaccounted for screen sizes are developed.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Transition animation methods and systems are described herein. As will be described in more detail below, an exemplary transition animation system may detect a screen size of a display screen associated with a computing device (e.g., a mobile device) executing an application (e.g., a mobile application), automatically generate, based on the detected screen size, a plurality of animation step values each corresponding to a different animation step included in a plurality of animation steps that are to be involved in an animation of a transition of a user interface associated with the application into the display screen, and direct the computing device to perform the plurality of animation steps in accordance with the generated animation step values.

As used herein, an "animation step" refers to a drawing or redrawing (also referred to herein as a rendering or re-rendering) of a display screen (i.e., a drawing or redrawing of contents displayed within the display screen). As will be described below, a plurality of animation steps may be sequentially performed by a computing device in order to animate a transition of a user interface into a display screen included within or otherwise associated with the computing device.

As will be described below, each animation step may have a corresponding animation step value. As used herein, an "animation step value" corresponding to an animation step may define a total number of pixels within a display screen that are to be occupied by a user interface being transitioned into the display screen immediately after the animation step is performed. As will be illustrated below, the total number of pixels that are to be occupied by a user interface after the animation step is performed may be expressed in terms of pixel width, pixel height, pixel area, and/or in any other manner. Alternatively, as will be described below, an animation step value corresponding to an animation step may define a speed at which the animation step is performed. The speed may be expressed in terms of pixels/second, time in between animation steps, and/or in any other manner.

Figure 1:
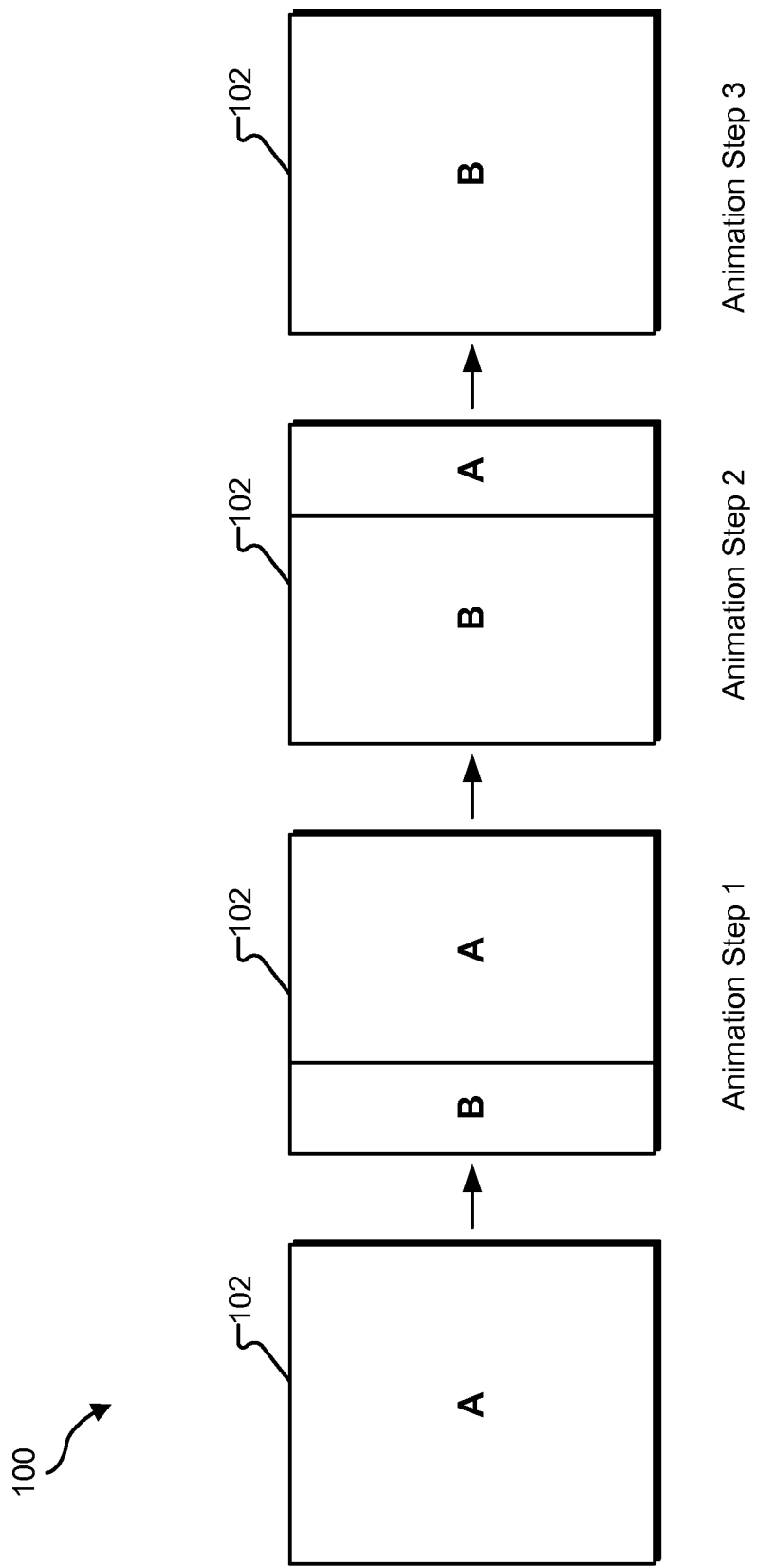
FIG. 1 illustrates an exemplary transition of a user interface into a display screen according to principles described herein.

To facilitate an understanding of the methods and systems described herein, FIG. 1 illustrates an exemplary transition 100 of a user interface into a display screen 102. In particular, FIG. 1 shows how a user interface (i.e., user interface B) may "slide" into display screen 102 from the left and in the process replace another user interface (i.e., user interface A) that is already displayed within display screen 102. A sliding transition is illustrative of the many different types of transitions that may be animated in accordance with the methods and systems described herein. For example, the methods and systems described herein may be utilized to animate fill-in transitions, fill-out transitions, zoom in transitions, zoom out transitions, transparent transitions, and/or any other type of transition as may serve a particular implementation.

As used herein, a "user interface" may include any display frame, graphic, and/or other interface that may be associated with (e.g., displayed by) an application executed by a computing device. A user interface may have any suitable size (i.e., pixel resolution). For example, user interfaces A and B, as shown in FIG. 1, may be configured to occupy all of the pixels included in display screen 102 once they have been entirely transitioned into display screen 102. Alternatively, a user interface may be configured to occupy less than all of the available pixels within display screen 102.

As shown in FIG. 1, user interface A may be initially located within the display screen. To animate a sliding transition of user interface B into display screen 102, a computing device associated with display screen 102 may perform a series of animation steps. Three animation steps are shown in FIG. 1 for illustrative purposes. During each animation step, display screen 102 is redrawn to include an increasingly larger portion of user interface B displayed therein. After the last animation step (i.e., the third animation step), user interface B has completely replaced user interface A and occupies all of the pixels of display screen 102.

Animation of a transition of a user interface into a display screen may be implemented in a variety of different manners. For example, each animation step included in a series of animation steps may be performed at a fixed speed. In other words, the time period in between performance of each animation step is the same. In this case, animation step values corresponding to the animation steps may define a total number of pixels within the display screen that are to be occupied by the user interface immediately after each animation step is performed.

Figure 2:
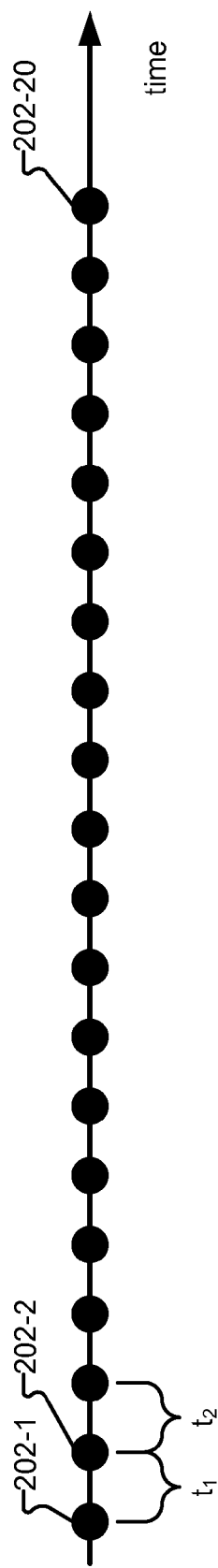
FIGS. 2-3 depict a series of twenty animation steps that may be performed over a period of time in order to animate a transition of a user interface into a display screen according to principles described herein.

To illustrate, FIG. 2 depicts a series of twenty animation steps 202 (e.g., animation steps 202-1 through 202-20) that may be performed over a period of time in order to animate a transition of a user interface into a display screen. As shown, each animation step 202 is performed at a fixed speed. In other words, the time period in between each animation step (e.g., time periods $t_1$ and $t_2$) is the same. In this case, animation step values corresponding to animation steps 202 may define a total number of pixels within the display screen that are to be occupied by the user interface immediately after each animation step 202 is performed. For example, Table 1 lists exemplary animation step values corresponding to each animation step 202 shown in FIG. 2 for a display screen that has a width of 620 pixels.

TABLE 1

| Animation Step | Animation Step Value (in pixel width) |
|---|---|
| 1 | 20 |
| 2 | 40 |
| 3 | 54 |
| 4 | 63 |
| 5 | 68 |
| 6 | 71 |
| 7 | 73 |
| 8 | 75 |
| 9 | 79 |
| 10 | 86 |
| 11 | 98 |
| 12 | 115 |
| 13 | 139 |
| 14 | 172 |
| 15 | 214 |
| 16 | 268 |
| 17 | 334 |
| 18 | 414 |
| 19 | 509 |
| 20 | 620 |

As shown in Table 1, after the first animation step (i.e., animation step 202-1), the user interface occupies a pixel width of 20 pixels. After the second animation step (i.e., animation step 202-2), the user interface occupies a pixel width of 40 pixels. The transition of the user interface into the display screen continues in accordance with the animation step values shown in Table 1 until the entire pixel width of 620 pixels is occupied by the user interface (i.e., after animation step 202-20).

As also shown in Table 1, the distance (in pixels) that the user interface moves into the display screen during each animation step 220 may vary from animation step to animation step. Hence by specifying particular animation step values, an application developer may vary the speed at which different portions of the animated transition occurs.

Alternatively, a user interface may be transitioned a fixed number of pixels into a display screen during each animation step. In this case, the animation step values corresponding to the animation steps that are performed to transition the user interface into the display screen may define a speed at which each animation step is performed.

Figure 3:
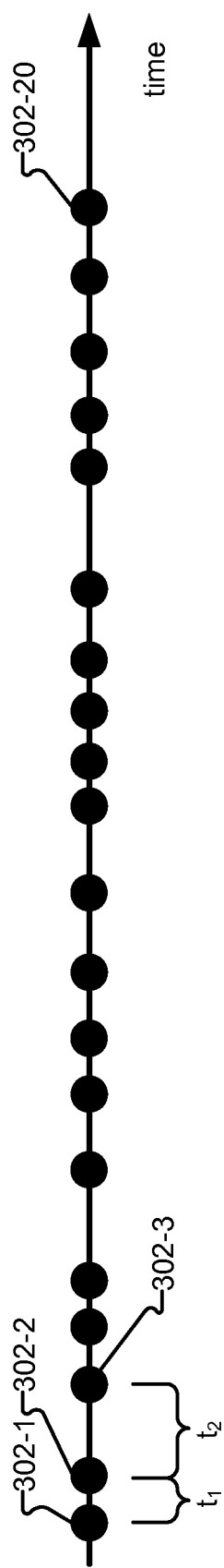

To illustrate, FIG. 3 depicts a series of twenty animation steps 302 (e.g., animation steps 302-1 through 302-20) that may be performed over a period of time in order to animate a transition of a user interface into a display screen. In this example, the display screen has a width of 620 pixels. Hence, the user interface is transitioned 31 pixels (i.e., 620 pixels divided by twenty animation steps) into the display screen during each animation step 302. The animation step values corresponding to animation steps 302 define the speed at which each animation step 302 is performed.

For example, Table 2 lists exemplary animation step values corresponding to each animation step 302 shown in FIG. 3.

TABLE 2

| Animation Step | Animation Step Value (in pixels/second) | Animation Step Value (in seconds) |
|---|---|---|
| 1 | 80 | 0.388 |
| 2 | 110 | 0.282 |
| 3 | 90 | 0.344 |
| 4 | 100 | 0.310 |
| 5 | 100 | 0.310 |
| 6 | 90 | 0.344 |
| 7 | 80 | 0.388 |
| 8 | 85 | 0.365 |
| 9 | 90 | 0.344 |
| 10 | 95 | 0.326 |
| 11 | 100 | 0.310 |
| 12 | 130 | 0.238 |
| 13 | 140 | 0.221 |
| 14 | 150 | 0.207 |
| 15 | 140 | 0.221 |
| 16 | 130 | 0.238 |
| 17 | 120 | 0.258 |
| 18 | 110 | 0.282 |
| 19 | 105 | 0.295 |
| 20 | 100 | 0.310 |

As shown in Table 2, the second animation step (i.e., animation step 302-2) is performed at a speed of 110 pixels/second. This means that the time in between the performance of the first animation step 202-1 and the performance of the second animation step 202-2 (i.e., $t_1$) is 0.282 seconds (i.e., 31 pixels divided by 110 pixels/second). As another example, the third animation step (i.e., animation step 302-3) is performed at a speed of 90 pixels/second. This means that the time in between the performance of the second animation step 202-2 and the performance of the third animation step 202-3 (i.e., $t_2$) is 0.344 seconds (i.e., 31 pixels divided by 90 pixels/second). Hence, an application developer may vary the speed at which different portions of the animated transition occur by specifying different speeds at which each animation step 302 is performed.

As illustrated, the animation step values corresponding to the animation steps involved in an animation of a transition of a user interface into a display screen depend on the screen size (e.g., the pixel width) of the display screen. For example, the animation step values listed in Tables 1 and 2 would be different for a display screen having a width of 1080 pixels. Hence, an application developer may have to manually input each of the animation step values. This is especially true if it is desirable to vary the speed at which the user interface is to be transitioned into the display screen (e.g., relatively slowly at the beginning of the transition and relatively fast at the end of the transition).

As will be described below, the methods and systems described herein may automatically generate the animation step values corresponding to a series of animation steps involved in an animation of a transition of a user interface into a display screen, thereby obviating the need for application developers to hard-code the animation step values when developing code representative of an application. In this manner, the methods and systems described herein may allow a computing device to effectively and accurately (e.g., smoothly) perform an animation of a transition of a user interface into a display screen regardless of the screen size of the display screen and/or the processing capabilities of the computing device.

Figure 4:
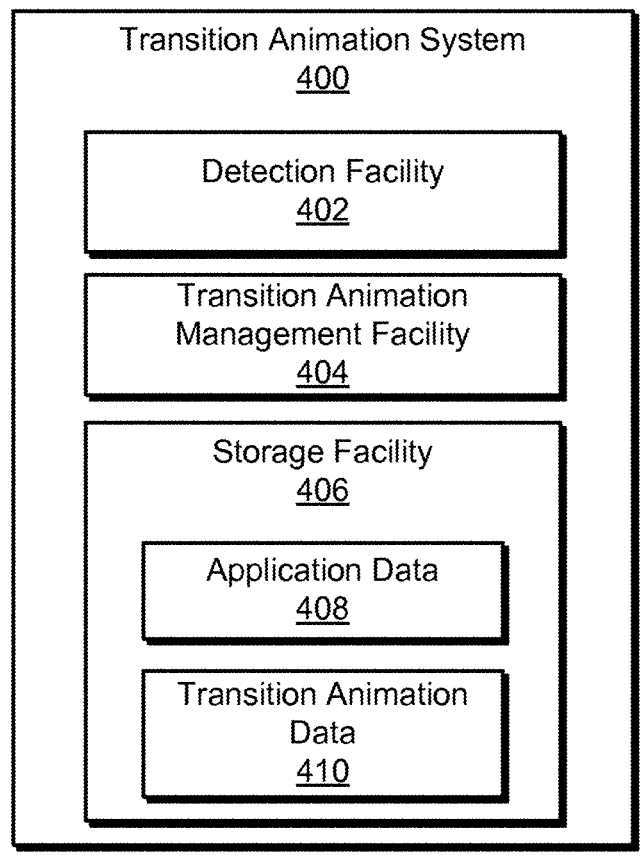
FIG. 4 illustrates an exemplary transition animation system according to principles described herein.

FIG. 4 illustrates an exemplary transition animation system 400 ("system 400") configured to perform the various operations described herein. As shown, system 400 may include, without limitation, a detection facility 402, a transition animation management facility 404, and a storage facility 406 selectively and communicatively coupled to one another. It will be recognized that although facilities 402-406 are shown to be separate facilities in FIG. 4, any of facilities 402-406 may be combined into fewer facilities, such as into a single facility, or divided into more facilities as may serve a particular implementation.

Detection facility 402 may be configured to detect a screen size (e.g., a pixel resolution) of a display screen associated with a computing device executing an application. For example, detection facility 402 may acquire data representative of the screen size by way of one or more application programming interfaces ("APIs") residing on the computing device that executes the software application.

Transition animation management facility 404 may be configured to perform one or more transition animation operations with respect to one or more user interfaces associated with (i.e., displayed by) the application being executed by the computing device. For example, transition animation management facility 404 may automatically generate a plurality of animation step values each corresponding to a different animation step included in a plurality of animation steps that are to be involved in an animation of a transition of a user interface associated with the application into the display screen. Transition animation management facility 404 may then direct the computing device to perform the plurality of animation steps in accordance with the generated animation step values.

Transition animation management facility 404 may automatically generate the plurality of animation step values that correspond to the plurality of animation steps involved in animating the transition of the user interface into the display screen in any suitable manner. For example, transition animation management facility 404 may automatically generate the animation step values during a runtime of the application and may base the generation of the animation step values on a detected screen size of a display screen within which the user interface is to be displayed.

The automatic generation of the animation step values may be further based on a plurality of sample animation step values associated with a subset of the animation steps and specified (e.g., by an application developer) in code (e.g., programming code) associated with the application. In some examples, as will be described below, the sample animation step values may specify a fraction (or percentage) of a sample display screen (having any suitable sample screen size) that is to be occupied by the user interface after an occurrence of each animation step included in the subset of animation steps. Alternatively, as will also be described below, the sample animation step values may specify a speed at which each animation step included in the subset of animation steps is to be performed with respect to a sample display screen having any suitable sample screen size. Examples of generating animation step values based on sample animation step values and on a detected screen size will be provided below.

Storage facility 406 may be configured to maintain application data 408 and transition animation data 410. Application data 408 may be representative of one or more applications configured to be executed by a computing device. Transition animation data 410 may be generated and/or utilized by transition animation management facility 404. For example, transition animation data 410 may include data representative or otherwise associated with one or more animation steps, animation step values, and/or any other type of information generated and/or utilized by transition animation management facility 404. It will be recognized that storage facility 406 may maintain additional or alternative data as may serve a particular implementation.

Figure 5:
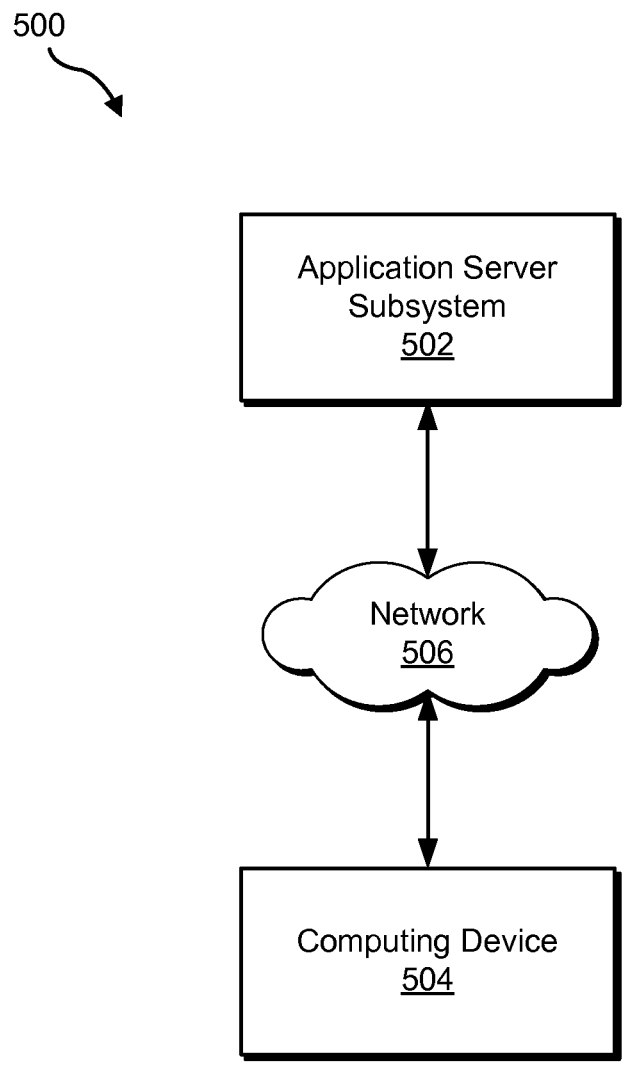
FIG. 5 illustrates an exemplary implementation of the system of FIG. 4 according to principles described herein.

FIG. 5 illustrates an exemplary implementation 500 of system 400 wherein an application server subsystem 502 is communicatively coupled to a computing device 504 by way of a network 506. As will be described in more detail below, detection facility 402, transition animation management facility 404, and storage facility 406 may each be implemented by application server subsystem 502 and/or computing device 504.

Application server subsystem 502 may be associated with an application provider (e.g., a mobile application provider), a service provider (e.g., a subscriber television service provider, a mobile communications service provider, an Internet service provider, etc.), a media content program provider (e.g., ESPN, NBC, etc.), and/or any other type of application provider. Accordingly, application server subsystem 502 may be configured to provide one or more application services to computing device 504. For example, application server subsystem 502 may be configured to manage (e.g., maintain, process, distribute, and/or generate) applications configured to be delivered to and/or executed by computing device 504. Application server subsystem 502 may be implemented by one or more computing devices as may serve a particular implementation.

Computing device 504 may be configured to access and/or execute one or more applications provided by application server subsystem 502. For example, computing device 504 may be configured to download an application from application server subsystem 502 and then execute the application at the direction of a user.

Computing device 504 may be implemented by any suitable combination of computing devices. For example, computing device 504 may be implemented by one or more mobile devices (e.g., mobile phones and/or tablet computers), personal computers, set-top box devices, digital video recording devices, personal-digital assistant devices, gaming devices, television devices, etc.

Application server subsystem 502 and computing device 504 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Application server subsystem 502 and computing device 504 may communicate using any suitable network. For example, as shown in FIG. 5, application server subsystem 502 and computing device 504 may be configured to communicate with each other by way of network 506. Network 506 may include one or more networks or types of networks capable of carrying communications and/or data signals between application server subsystem 502 and computing device 504. For example, network 506 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

In certain embodiments, system 400 may be implemented entirely by application server subsystem 502 or by computing device 504. In other embodiments, components of system 400 may be distributed across application server subsystem 502 and computing device 504.

Figure 6:
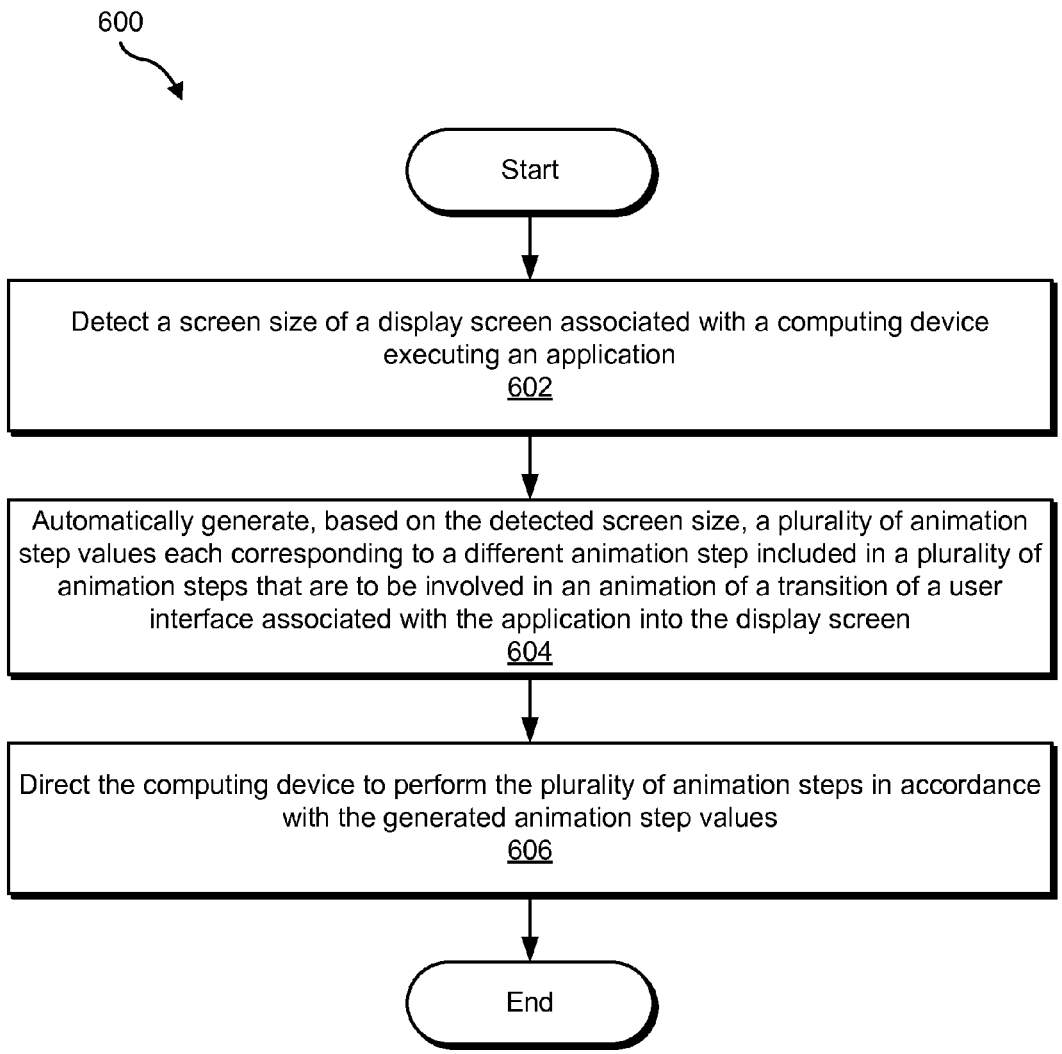
FIG. 6 illustrates an exemplary transition animation method according to principles described herein.

FIG. 6 illustrates an exemplary transition animation method 600. While FIG. 6 illustrates exemplary steps according to one embodiment, other embodiments may omit, add to, reorder, and/or modify any of the steps shown in FIG. 6. One or more of the steps shown in FIG. 6 may be performed by system 400 and/or any implementation thereof.

In step 602, a transition animation system detects a screen size of a display screen associated with a computing device executing an application. Step 602 may be performed in any of the ways described herein.

In step 604, the transition animation system automatically generates, based on the detected screen size, a plurality of animation step values each corresponding to a different animation step included in a plurality of animation steps that are to be involved in an animation of a transition of a user interface associated with the application into the display screen. Step 604 may be performed in any of the ways described herein.

In step 606, the transition animation system directs the computing device to perform the plurality of animation steps in accordance with the generated animation step values. Step 606 may be performed in any of the ways described herein.

As mentioned, animation step values corresponding to a plurality of animation steps involved in an animation of a transition of a user interface into a display screen may be based on a screen size of the display screen, which may be detected at runtime of an application, and on a plurality of sample animation step values, which may be provided by an application developer during a development of code associated with the application.

For example, an application developer may specify (e.g., in code associated with the application and/or within another application that interfaces with the application) a total number of animation steps to be involved in an animation of a transition of a user interface into a display screen and a plurality of sample animation step values corresponding to a subset of the specified animation steps. As described above, the sample animation step values may specify a fraction of a sample display screen (having any suitable sample screen size) that is to be occupied by the user interface after an occurrence of each animation step included in the subset of animation steps. Alternatively, the sample animation step values may specify a speed at which each animation step included in the subset of animation steps is to be performed with respect to a sample display screen having any suitable sample screen size.

Any number of sample animation step values may be specified as may serve a particular implementation. For example, an application developer may provide a sample animation step value for each animation step at which it is desirable to adjust the speed of the animation transition. Examples of this will be provided below.

An application developer may also specify (e.g., in code associated with the application and/or within another application that interfaces with the application) an objective formula that describes the animation of the user interface into the display screen. The objective formula may include any suitable continuous math formula that describes the animation of the user interface into the display screen. For example, the objective formula may include a polynomial function, a triangle function, a signal function, a pre-defined animation speed curve, and/or any other type of formula as may serve a particular implementation. An exemplary objective formula will be provided below.

As will be described below, system 100 may use the sample animation step values and the detected screen size to determine a plurality of coefficients included in the objective formula. As will be illustrated below, this may be performed using any suitable equation solver heuristic, interpolation heuristic, and/or curve fitting heuristic. The objective formula, the determined coefficients, and the detected screen size may then be used by system 100 to automatically generate an animation step value that corresponds to each animation step included in the plurality of animation steps involved in the animation of the transition of the user interface into the display screen.

Two examples of generating animation step values corresponding to a plurality of animation steps involved in an animation of a transition of a user interface into a display screen will now be described. It will be assumed for purposes of these examples that a sliding transition is to be animated. In the first example, the animation step values define a total number of pixels within the display screen that are to be occupied by the user interface immediately after each animation step is performed. In the second example, the animation step values define a speed at which each animation step is performed. It will be recognized that the examples provided herein are merely illustrative of the many possible examples that may be realized in accordance with the methods and systems described herein.

Turning now to the first example, an application developer may specify in code associated with an application that twenty animation steps are to be performed in order to animate a transition of a user interface into any display screen (referred to herein as a "sample display screen") having any suitable screen size. The application developer may further specify four sample animation values corresponding to four of the animation steps. The sample animation step values and corresponding animation steps are listed in Table 3.

TABLE 3

| Animation Step | Sample Animation Step Value |
|---|---|
| 1 | 1/31 |
| 2 | 2/31 |
| 18 | 2/3 |
| 20 | 1 |

As shown in Table 3, each sample animation step value specifies a fraction of the sample display screen that is to be occupied by the user interface after an occurrence of animation steps 1, 2, 18, and 20. For example, Table 3 specifies that 1/31 of the sample display screen is to be occupied by the user interface after animation step 1.

The application developer may also specify an objective formula that describes the animation of the transition of the user interface into the sample display screen. For example, with four sample animation step values specified as in Table 3, the application developer may specify that the following polynomial function be used as the objective formula:

$$\text{Occupied Screen Width} = A \times \text{step}^3 + B \times \text{step}^2 + C \times \text{step} + D \quad \text{(Equation 1)}.$$

In Equation 1, "Occupied Screen Width" refers to a total number of pixels (in terms of pixel width) within a display screen that the user interface is to occupy after a particular animation step included in the subset of animation steps that correspond to the sample animation step values (e.g., animation step 1 shown in Table 3) is performed. The variable "step" refers to a particular animation step number. "A," "B," "C," and "D" are coefficients that, as will be described below, may be calculated using any suitable equation solver heuristic. It will be recognized that the polynomial function may be of any other suitable degree depending on the number of sample animation step values specified by the application developer.

The application may then be loaded onto (e.g., installed on) a computing device, which may execute the application. During runtime of the application, system 100 may determine that a display screen associated with the computing device has a pixel width of 620 pixels. Using this information, along with the sample animation step values specified in code associated with the application, system 100 may automatically generate animation step values for each of the twenty animation steps.

To illustrate, system 100 may build a formula array based on the sample animation step values. For example, using the sample animation step values listed in Table 3 and the objective formula specified in Equation 1, system 100 may generate the following four equations:

$$\frac{1}{31}(620) = A \times 1^3 + B \times 1^2 + C \times 1 + D, \quad \text{(Equation 2)}$$

$$\frac{2}{31}(620) = A \times 2^3 + B \times 2^2 + C \times 2 + D, \quad \text{(Equation 3)}$$

$$\frac{2}{3}(620) = A \times 18^3 + B \times 18^2 + C \times 18 + D, \text{ and} \quad \text{(Equation 4)}$$

$$620 = A \times 20^3 + B \times 20^2 + C \times 20 + D. \quad \text{(Equation 5)}$$

With four equations and four unknowns (i.e., coefficients A, B, C, and D), the four coefficients may be calculated by system 100 using any suitable equation solver heuristic. For example, system 100 may determine that A=0.2224, B=−4.4713, C=31.8571, and D=−7.6082.

These coefficients may be plugged into Equation 1 to obtain an objective formula specific to the particular screen size of the display screen into which the user interface is to be transitioned:

$$\text{Occupied Screen Width} = 0.2224 \times \text{step}^3 - 4.4713 \times \text{step}^2 + 31.8571 \times \text{step} - 7.6082 \quad \text{(Equation 6)}.$$

Each of the twenty animation steps may be plugged into Equation 6 to determine the actual animation step values (referred to as "Occupied Screen Width" in Equation 6) that correspond to each of the twenty animation steps. For example, the animation step value for animation step 3 may be 0.2224*3^3−4.4713*3^2+31.8571*3−7.6082, which equals 53.726. This result may be rounded up to 54, which indicates that after the third animation step has been performed, the user interface will occupy a pixel width of 54 pixels within the display screen. In a similar manner, system 100 automatically generates animation step values for each of the other nineteen animation steps, with the results being the same as those listed in Table 1 above.

Turning now to the second example in which the animation step values define a speed at which each animation step is performed, an application developer may specify in code associated with an application that thirty animation steps are to be performed in order to animate a transition of a user interface into a sample display screen. The application developer may further specify five sample animation values corresponding to five of the animation steps. The sample animation step values and corresponding animation steps are listed in Table 4.

TABLE 4

| Animation Step | Sample Animation Step Value (pixels/second) |
|---|---|
| 1 | 100 |
| 2 | 110 |
| 10 | 300 |
| 20 | 600 |
| 30 | 2000 |

As shown in Table 4, each sample animation step value specifies a speed at which animation steps 1, 2, 10, 20, and 30 are to be performed. For example, Table 4 specifies that the first animation step is to be performed at 100 pixels/second.

Because there are five sample animation step values, the objective formula may include a four degree polynomial function. To avoid the processing requirements of solving a relatively high degree polynomial function such as this, an interpolation heuristic and/or a curve fitting heuristic may be employed.

To illustrate, a Splines interpolation heuristic may be used by system 100 to determine the animation step values corresponding to each of the thirty animation steps. In Splines interpolation, the sample animation step values are grouped into groups that have one overlapped joint point. For example, the sample animation step values may be grouped into the following two groups:

group1: (1, 100) (2, 110) (10, 300); and
group2: (10, 300) (20, 600) (30, 2000).

The first number listed in each data pair is the animation step and the second number listed in each data pair is the animation step value. As shown, each group includes the sample animation step value corresponding to the tenth animation step (i.e., 300). An objective formula may then be specified for each group. For example, the objective formulas for group 1 and group 2, respectively, may be the following polynomial functions:

$$f_1(step) = A_1 \times step^3 + B_1 \times step^2 + C_1 \times step + D_1 \quad \text{(Equation 7), and}$$

$$f_2(step) = A_2 \times step^3 + B_2 \times step^2 + C_2 \times step + D_2 \quad \text{(Equation 8).}$$

In order to ensure that the joint points are smooth between the two functions, Equations 7 and 8 may be required to have the same derivations. Hence:

$$f'_1(step) = 3 \times A_1 \times step^2 + 2 \times B_1 \times step + C_1 \quad \text{(Equation 9),}$$

$$f'_2(step) = 3 \times A_2 \times step^2 + 2 \times B_2 \times step + C_2 \quad \text{(Equation 10),}$$

$$f''_1(step) = 6 \times A_1 \times step + 2 \times B_1 \quad \text{(Equation 11), and}$$

$$f''_2(step) = 6 \times A_2 \times step + 2 \times B_2 \quad \text{(Equation 12).}$$

Using Equations 9-12, system 100 may derive the following equations (where $Y_n$ represents the sample animation step values and $X_n$ represents the animation steps):

$$Y_1 = A_1 \times x_1^3 + B_1 \times x_1^2 + C_1 \times x_1 + D_1 \quad \text{(Equation 13),}$$

$$Y_2 = A_1 \times x_2^3 + B_1 \times x_2^2 + C_1 \times x_2 + D_1 \quad \text{(Equation 14),}$$

$$Y_3 = A_1 \times x_3^3 + B_1 \times x_3^2 + C_1 \times x_3 + D_1 \quad \text{(Equation 15),}$$

$$Y_3 = A_2 \times x_3^3 + B_2 \times x_3^2 + C_2 \times x_3 + D_2 \quad \text{(Equation 16),}$$

$$Y_4 = A_2 \times x_4^3 + B_2 \times x_4^2 + C_2 \times x_4 + D_2 \quad \text{(Equation 17),}$$

$$Y_5 = A_2 \times x_5^3 + B_2 \times x_5^2 + C_2 \times x_5 + D_2 \quad \text{(Equation 18),}$$

$$3 \times A_1 \times x_3^2 + 2 \times B_1 \times x_3^1 + C_1 = 3 \times A_2 \times x_3^2 + 2 \times B_2 \times x_3^1 + C_2 \quad \text{(Equation 19), and}$$

$$6 \times A_1 \times x_3^1 + 2 \times B_1 = 6 \times A_2 \times x_3^1 + 2 \times B_2 \quad \text{(Equation 20).}$$

As shown in Equations 13-20, there are eight equations with eight unknown constants (i.e., $A_1, B_1, C_1, D_1, A_2, B_2, C_2$, and $D_2$). System may plug the sample animation step values and their corresponding animation step numbers into Equations 13-20 to determine that $A_1 = -0.189368$, $B_1 = 3.98956169$, $C_1 = -0.64310912$, $D_1 = 96.84291542$, $A_2 = 0.245777$, $B_2 = -9.246627$, $C_2 = 135.354835$, and $D_2 = -374.66265$.

During runtime of the application, system 100 may determine that a display screen associated with the computing device has a pixel width of 630 and that code associated with the application specifies that thirty animation steps will be performed. This means that the user interface will be transitioned into the display screen 21 pixels in width during each animation step. Equation 7 (with the determined values for $A_1$-$D_1$ included therein) may be used to generate animation step values for animation steps 1 through 10, and Equation 8 (with the determined values for $A_2$-$D_2$ included therein) may be used to generate animation step values for animation steps 10-30. Table 5 shows the results of such an operation:

TABLE 5

| Animation Step | Animation Step Value (in pixels/second) | Animation Step Value (in seconds) |
|---|---|---|
| 1 | 100 | 0.210 |
| 2 | 110 | 0.191 |
| 3 | 126 | 0.167 |
| 4 | 146 | 0.144 |
| 5 | 170 | 0.124 |
| 6 | 196 | 0.107 |
| 7 | 223 | 0.094 |
| 8 | 250 | 0.084 |
| 9 | 276 | 0.076 |
| 10 | 300 | 0.070 |
| 11 | 323 | 0.065 |
| 12 | 343 | 0.061 |
| 13 | 362 | 0.058 |
| 14 | 382 | 0.055 |
| 15 | 405 | 0.052 |
| 16 | 431 | 0.049 |
| 17 | 462 | 0.045 |
| 18 | 499 | 0.042 |
| 19 | 545 | 0.039 |
| 20 | 600 | 0.035 |
| 21 | 666 | 0.032 |
| 22 | 745 | 0.028 |
| 23 | 837 | 0.025 |
| 24 | 945 | 0.022 |
| 25 | 1070 | 0.020 |
| 26 | 1214 | 0.017 |
| 27 | 1377 | 0.015 |
| 28 | 1561 | 0.013 |
| 29 | 1768 | 0.012 |
| 30 | 2000 | 0.011 |

Hence, as shown in Table 5, system 100 may automatically determine the speed of each animation step (i.e., the amount of time that separates each animation step). In this manner, the application developer does not have to manually specify each animation step value for each possible screen size.

Figure 7:
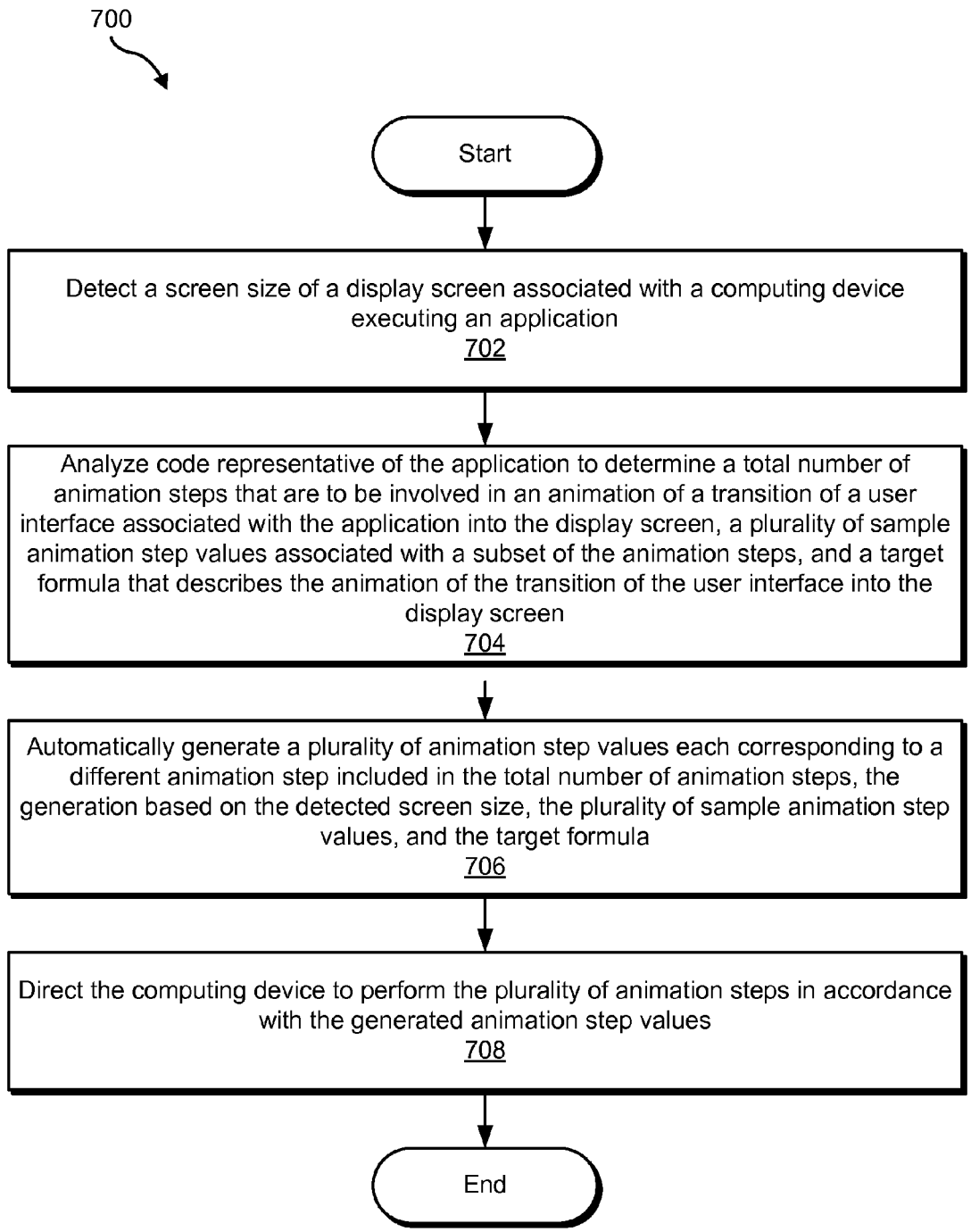
FIG. 7 illustrates another exemplary transition animation method according to principles described herein.

FIG. 7 illustrates another exemplary transition animation method 700. While FIG. 7 illustrates exemplary steps according to one embodiment, other embodiments may omit, add to, reorder, and/or modify any of the steps shown in FIG. 7. One or more of the steps shown in FIG. 7 may be performed by system 400 and/or any implementation thereof.

In step 702, a transition animation system detects a screen size of a display screen associated with a computing device executing an application. Step 702 may be performed in any of the ways described herein.

In step 704, the transition animation system analyzes code representative of the application to determine a total number of animation steps that are to be involved in an animation of a transition of a user interface associated with the application into the display screen, a plurality of sample animation step values associated with a subset of the animation steps, and an objective formula that describes the animation of the transition of the user interface into the display screen. Step 704 may be performed in any of the ways described herein.

In step 706, the transition animation system automatically generates a plurality of animation step values each corresponding to a different animation step included in the total number of animation steps. As described above, this generation may be based on the detected screen size, the plurality of sample animation step values, and the objective formula. Step 706 may be performed in any of the ways described herein.

In step 708, the transition animation system directs the computing device to perform the plurality of animation steps in accordance with the generated animation step values. Step 708 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 8:
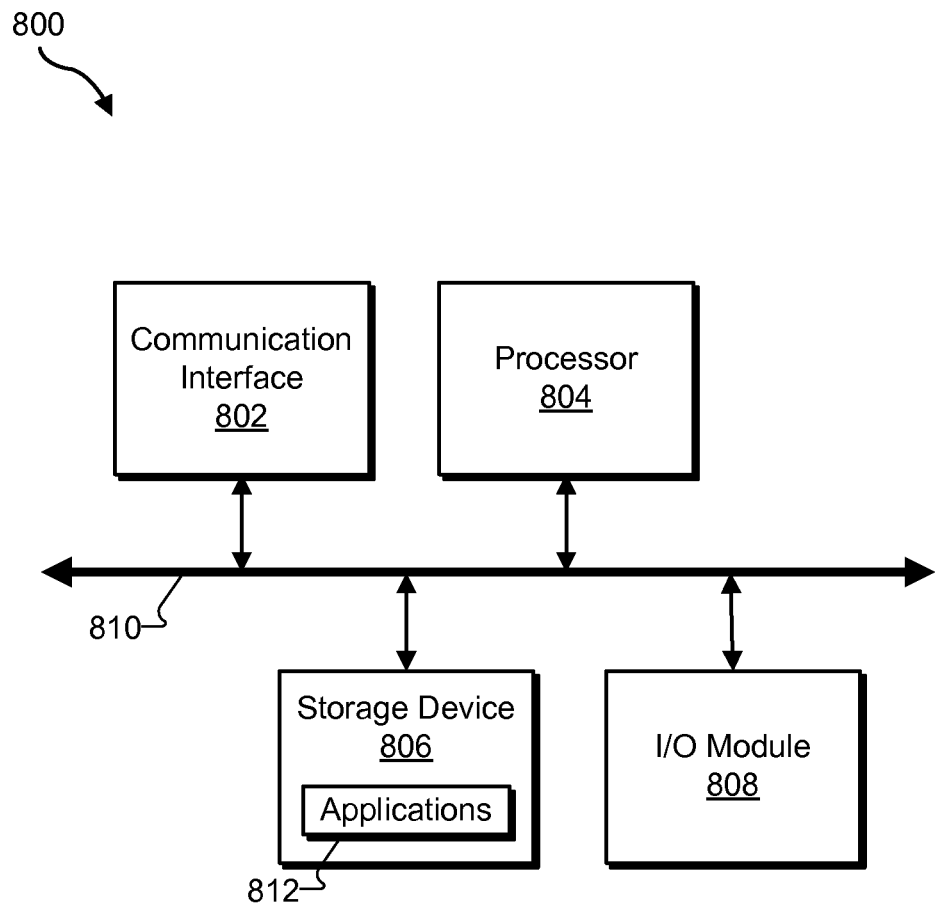
FIG. 8 illustrates an exemplary computing device according to principles described herein.

FIG. 8 illustrates an exemplary computing device 800 that may be configured to perform one or more of the processes described herein. As shown in FIG. 8, computing device 800 may include a communication interface 802, a processor 804, a storage device 806, and an input/output ("I/O") module 808 communicatively connected via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 806. For example, data representative of one or more executable applications 812 (which may include, but are not limited to, one or more of the software applications described herein) configured to direct processor 804 to perform any of the operations described herein may be stored within storage device 806. In some examples, data may be arranged in one or more databases residing within storage device 806.

I/O module 808 may be configured to receive user input and provide user output and may include any hardware, firmware, software, or combination thereof supportive of input and output capabilities. For example, I/O module 808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 808 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with detection facility 402 and/or transition animation management facility 404. Likewise, storage facility 406 may be implemented by or within storage device 806.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a transition animation system, a screen size of a display screen associated with a mobile computing device executing a mobile application;
   analyzing, by the transition animation system, code associated with the mobile application to determine a plurality of sample animation step values associated with a subset of animation steps included in a plurality of animation steps that are to be involved in an animation of a transition of a user interface associated with the mobile application into the display screen in place of another user interface already displayed in the display screen, each sample animation step value included in the plurality of sample animation step values specifying a speed at which an animation step included in the subset of animation steps is to be performed with respect to a sample display screen having a sample screen size;
   automatically generating, by the transition animation system based on the detected screen size and the plurality of sample animation step values, a plurality of animation step values each corresponding to a different animation step included in the plurality of animation steps, the plurality of animation step values defining different speeds at which each animation step included in the plurality of animation steps is performed such that at least one animation step included in the plurality of animation steps occurs at a first speed and at least one additional animation step included in the plurality of animation steps occurs at a second speed that is different from the first speed; and
   directing, by the transition animation system, the mobile computing device to sequentially perform the plurality of animation steps in accordance with the generated animation step values by directing the mobile computing device to transition the user interface a fixed number of pixels into the display screen during each of the plurality of animation steps in accordance with the defined speeds;

wherein each animation step included in the plurality of animation steps includes a redrawing of contents displayed within the display screen to animate the transition.

2. The method of claim 1, wherein the automatically generating of the plurality of animation step values comprises:

using the sample animation step values and the detected screen size to determine a plurality of coefficients included in an objective formula that describes the animation of the transition of the user interface into the display screen; and using the objective formula, the determined coefficients, and the detected screen size to automatically generate the plurality of animation step values.

3. The method of claim 2, wherein the objective formula comprises a polynomial function.

4. The method of claim 2, wherein the using of the sample animation step values to determine the plurality of coefficients included in the objective formula comprises performing at least one of an interpolation heuristic and a curve fitting heuristic to determine the plurality of coefficients included in the objective formula.

5. The method of claim 1, wherein the detecting of the screen size of the display screen comprises acquiring data representative of the screen size from an application programming interface associated with the mobile computing device.

6. The method of claim 1, wherein a total number of animation steps included in the plurality of animation steps is specified in the code associated with the mobile application.

7. The method of claim 1, wherein the automatically generating of the plurality of animation step values is performed during a runtime of the mobile application.

8. The method of claim 1, wherein the user interface is configured to occupy the entire display screen after being transitioned into the display screen.

9. A method comprising:

detecting, by a transition animation system, a screen size of a display screen associated with a mobile computing device executing a mobile application;

analyzing, by the transition animation system, code representative of the mobile application to determine a total number of animation steps that are to be involved in an animation of a transition of a user interface associated with the mobile application into the display screen in place of another user interface already displayed in the display screen, a plurality of sample animation step values associated with a subset of the animation steps, and an objective formula that describes the animation of the transition of the user interface into the display screen, each sample animation step value included in the plurality of sample animation step values specifying a speed at which an animation step included in the subset of animation steps is to be performed with respect to a sample display screen having a sample screen size;

automatically generating, by the transition animation system, a plurality of animation step values each corresponding to a different animation step included in the total number of animation steps, the generating based on the detected screen size, the plurality of sample animation step values, and the objective formula, the plurality of animation step values defining different speeds at which each animation step included in the plurality of animation steps is performed such that at least one animation step included in the plurality of animation steps occurs at a first speed and at least one additional animation step included in the plurality of animation steps occurs at a second speed that is different from the first speed; and directing, by the transition animation system, the mobile computing device to sequentially perform the plurality of animation steps in accordance with the generated animation step values by directing the mobile computing device to transition the user interface a fixed number of pixels into the display screen during each of the plurality of animation steps in accordance with the defined speeds;

wherein each animation step included in the plurality of animation steps includes a redrawing of contents displayed within the display screen to animate the transition.

10. A system comprising:

at least one computing device including a processor and comprising:

a detection facility that directs the processor to detect a screen size of a display screen associated with a mobile computing device executing a mobile application; and a transition animation management facility communicatively coupled to the detection facility and that directs the processor to analyze code associated with the mobile application to determine a plurality of sample animation step values associated with a subset of animation steps included in a plurality of animation steps that are to be involved in an animation of a transition of a user interface associated with the mobile application into the display screen in place of another user interface already displayed in the display screen, each sample animation step value included in the plurality of sample animation step values specifying a speed at which an animation step included in the subset of animation steps is to be performed with respect to a sample display screen having a sample screen size, automatically generate, based on the detected screen size and the plurality of sample animation step values, a plurality of animation step values each corresponding to a different animation step included in the plurality of animation steps, the plurality of animation step values defining different speeds at which each animation step included in the plurality of animation steps is performed such that at least one animation step included in the plurality of animation steps occurs at a first speed and at least one additional animation step included in the plurality of animation steps occurs at a second speed that is different from the first speed, and sequentially perform the plurality of animation steps in accordance with the generated animation step values by directing the mobile computing device to transition the user interface a fixed number of pixels into the display screen during each of the plurality of animation steps in accordance with the defined speeds, wherein each animation step included in the plurality of animation steps includes a redrawing of contents displayed within the display screen to animate the transition.

* * * * *